United States Patent
Huang et al.

(10) Patent No.: US 7,365,885 B2
(45) Date of Patent: Apr. 29, 2008

(54) SCANNER WITH FOOLPROOF FUNCTION OF INPUTTING UNITS AND METHOD OF FUNCTIONING

(75) Inventors: Wen-Yung Huang, Miao-Li (TW); Stone Cheng, Kaohsiung (TW)

(73) Assignee: Transpacific IP, Ltd., Taipei (TW)

( * ) Notice: Subject to any disclaimer, the term of this patent is extended or adjusted under 35 U.S.C. 154(b) by 1118 days.

(21) Appl. No.: 10/193,242

(22) Filed: Jul. 12, 2002

(65) Prior Publication Data

US 2004/0008385 A1    Jan. 15, 2004

(51) Int. Cl.
*H04N 1/32* (2006.01)
*H04N 1/00* (2006.01)

(52) U.S. Cl. .................. 358/442; 358/468; 358/400; 358/434

(58) Field of Classification Search ............. 358/442, 358/468, 400, 434; 399/81; 708/140; 345/172
See application file for complete search history.

(56) References Cited

U.S. PATENT DOCUMENTS 5,920,405 A * 7/1999 McIntyre et al. ........... 358/442
6,978,449 B2 * 12/2005 Chen et al. ................. 717/140
2002/0033967 A1 * 3/2002 Liu .............................. 358/402

* cited by examiner

*Primary Examiner*—Houshang Safaipour
(74) *Attorney, Agent, or Firm*—Stolowitz Ford Cowger LLP

(57) ABSTRACT

A method of providing the inputting units of the scanner with a foolproof function. Initially, while a specific inputting unit is activated, such as a push button being pushed, the connection between the operation of the scanner and other inputting units is terminated. This terminated connection is not regained until the specific action, which corresponds to the specific inputting unit, finishes. Moreover, an "activation" message can be directly displayed on the scanner while this specific inputting unit is activated, and while the scanner is processing some specific action, this action can be terminated with the function of the scanner and the connection between all inputting units regained as soon as this specific inputting unit is activated again. For any scanner with the foolproof function, while a specific inputting unit is activated, not only a corresponding specific action is performed but also the connection between the performing specific action and all inputting units is controlled.

20 Claims, 4 Drawing Sheets

SCANNER WITH FOOLPROOF FUNCTION OF INPUTTING UNITS AND METHOD OF FUNCTIONING

BACKGROUND OF THE INVENTION

1. Field of the Invention

The present invention is concerned with a scanner with inputting foolproof function and also a method of providing the scanner with hardware-cancellation function, hardware-non-cancellation function, and status-showing function.

2. Description of the Prior Art

There are three common approaches to operate the scanner:

First, there is no inputting unit, such as push button or switch, on the scanner, which is controlled only through the computer by the user; Second, the scanner has several inputting units itself and the user can control the scanner through activating these inputting units; Third, controlling the scanner with an approach mixing the two approaches mentioned above. In recent years, with the current of the increasing emphasis on the user's convenience of the consumption electronic products, the second approach of which said above is applied more and more widely.

For example, to install or set up several inputting unit push button in scanner, such as [scanning], [scanning and sending as an e-mail], [scanning and saving as a file], [scanning and sending as a FAX] and [scanning and then printing] etc., to provide higher operating convenience for the user. However, the second approach of above-mentioned usually has following drawbacks in practical application:

Firstly: It is not easy for the user to determine the status of each inputting unit. Since the scanner is more and more miniaturized, equipped with push buttons rather than switches, usually there is not any obvious change of the geometric profile (location) provided for the user to identify the different statuses of the inputting unit.

Secondly: The user cannot interrupt the action in process of the scanner directly through the scanner, in other words, there is no Hardware Cancellation function. It is not like controlling the scanner with the computer, in which the user can interrupt the action in process of the scanner by interrupting the applied program at any time; if the scanner is controlled directly through each inputting unit, the flexibility of using the scanner is worse, i.e. any specific action need to run out completely as soon as it is activated and it cannot be interrupted even if the user has such need. (For example, the user finds out that there is a location shift of the document and needs to make some modification after the scanning starts.)

Thirdly: The hazard of accidentally activating the individual inputting unit can not be effectively eliminated. Since each inputting unit is located directly on the surface of the scanner, it is hard to avoid activating by accidentally touching. If at this time the scanner is also in process of executing a specific action, the normal operation of the scanner will be obviously interfered since the activated inputting unit will induce another specific action.

Thereupon, it is necessary to improve the current approach of controlling the scanner directly through the inputting units on it, to add a foolproof function to the scanner, and to provide the user with the convenience of operating the scanner just like that of operating the convenient camera.

SUMMARY OF THE INVENTION

The main purpose of the present invention is to improve the antecedent technique of controlling the scanner directly through the inputting units on it.

Another main purpose of the present invention is to provide a scanner with foolproof function, and also to provide the method of equipping the scanner with hardware-cancellation function, hardware-non-cancellation function and status-showing function.

The present invention is to bring up a method for providing the inputting units of the scanner with a foolproof function. When certain specific inputting unit is started, it will cut off the connection between the operation of the scanner and other inputting units, and perform a specific action corresponding to this specific inputting unit; the terminated connection between the operation of the scanner and all the other inputting units is not regained until this specific action is finished. Firstly, an "activation" message appears directly on the scanner while the specific inputting unit is activated: Secondly, while the scanner is executing a specific action, it will terminate the specific action in process and resume the terminated connection between the operation of the scanner and all the other inputting units if the specific inputting unit is activated again.

The invention also brings up a scanner with the foolproof function, which can, while a specific inputting unit is activated, perform a specific action corresponding to the unit, and also control the connection between each inputting unit and the performing specific action of the scanner. Thereupon, in the process of performing a specific action, the impact caused by starting other inputting units can be eliminated, and the specific action can be interrupted because of re-activating this specific inputting unit.

DESCRIPTION OF THE PREFERRED EMBODIMENT

Figure 1:
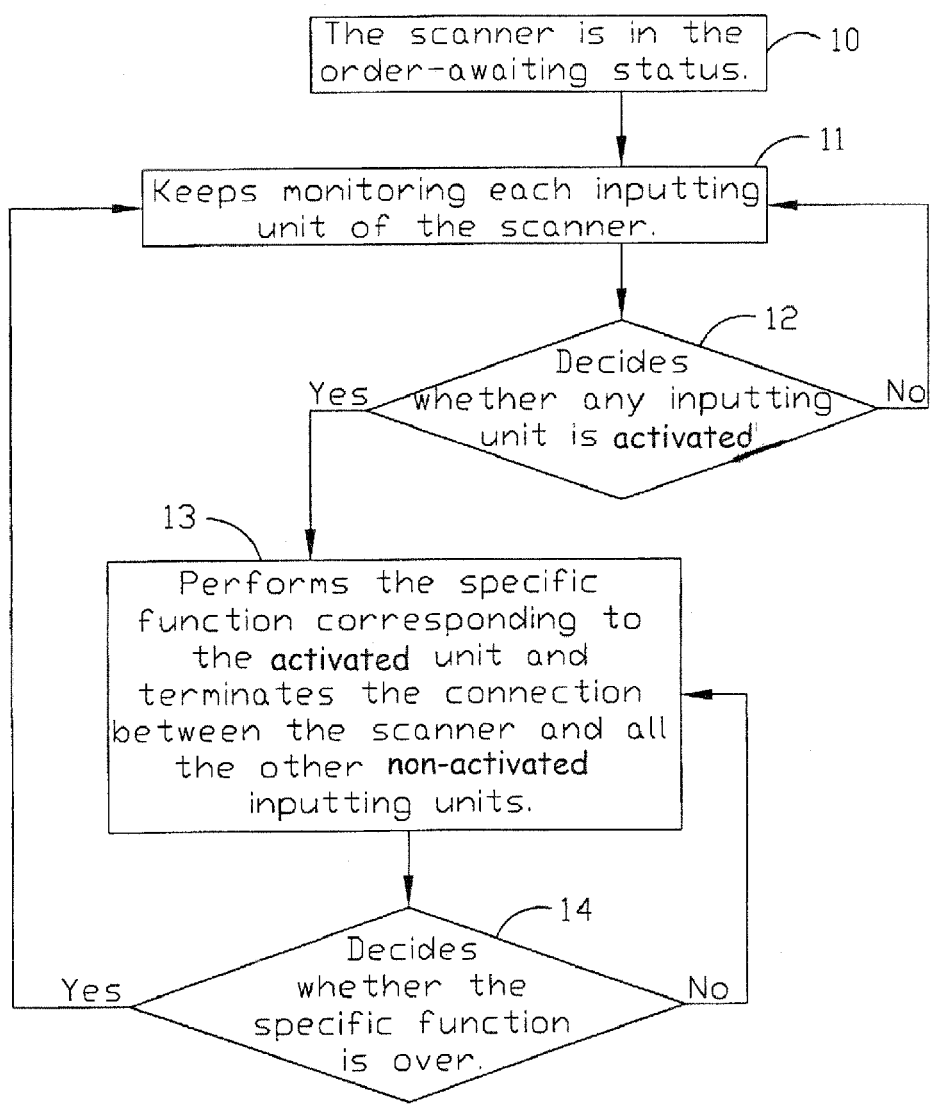
FIG. 1 to FIG. 3 are the basic technological process of the three preferred embodiment of the invention.

In the prior technique, the drawback of the user does not easily know the current status of each inputting unit is, obviously, due to the lack of specific displaying function of each inputting unit itself, which indicates the status of each inputting unit. Thereupon, one solution is to add a display device to each inputting unit, which can display different signals while the inputting unit is in different statuses.

For example, we can add a light-emitting component (such as LED) to the inputting unit, which emits light when the inputting unit is started and does not emit light when the unit is not started. Of course, the change of status can also be indicated through changing the geometric profile and geometric location. The invention does not confine the details of how it is indicated. For example, a small screen can be set up on the scanner and every time an inputting unit is activated, the code name of the unit will be displayed on the screen.

With the prior technique, the user cannot interrupt the action in process of the scanner directly through the scanner because the scanner only has the function of performing a certain specific action after receiving a signal from the inputting unit but does not have the function of canceling the certain specific action in process after receiving a signal from the inputting unit. Thereupon, one solution is to alter the controlling device connecting each inputting unit and the performing device of each specific action of the scanner, enabling the controlling device to receive the signal from the inputting unit and command the performing device to cancel the action in process while the certain specific action is being performed.

For example, when the performing device performs according to the status of each inputting unit with an Application Specific Integrated Circuit (ASIC), the layout of this ASIC can be altered to make the ASIC keep monitoring the status of corresponding inputting unit while a specific action is in process and command the performing device to cancel the action in process while receiving the same signal from the corresponding inputting unit once again. Of course, the invention does not confine the details of how to alter the connection between each inputting device and performing device. For example, it is also possible to alter the detail of each inputting unit, making the signal of the inputting unit being started in the order-awaiting status different from that of the unit being restarted in the activating status, and making the controlling device send different working commands to the performing device according to different signals received.

In the prior technique, the hazard of accidentally starting other inputting units while in the process of performing a specific action cannot be efficiently eliminated because, which is very obvious, that the status of each inputting unit (being started or not) is independent and is not influenced whether other inputting units are started or not. Therefore, one solution is to alter the connection between each inputting unit, or even the connection between each inputting unit and the controlling device, and then when a certain inputting unit is activated, other inputting units cannot be started or the controlling device does not change its working command sent to the performing device in the following.

For example, when the controlling device is an ASIC, its layout can be altered so that after a certain inputting unit is activated, the ASIC will not respond to the signals from any other inputting units that are being started until the specific action corresponding to the previously activated inputting unit is finished. For another example, a switch can be set up between each inputting unit and the controlling device, and in each time only one inputting unit is permitted to connect with the controlling device. When a certain inputting unit is activated, the switch will be fixed between this inputting unit and the controlling device, and the switch will not be released until the specific action corresponding is finished. Of course, the invention does not confine the detail of alteration.

According to the discussion above, one preferred embodiment of the invention is a method of functioning the scanner of inputting units with foolproof function.

As shown in FIG. 1, comprising essentially of the basic steps as follows:

As shown in the activating flow block 10, the scanner is in the order-awaiting status.

As shown in the monitoring flow block 11, it keeps monitoring each inputting unit of the scanner. These inputting units include at least mechanical buttons, electronic buttons, mechanical switches, and electronic buttons, and can also include combinations of the items mentioned above.

As shown in the flow block 12 and reacting flow block 13 show, if these inputting units do not receive any signal (are not activated), it will keep monitoring on these inputting units. When certain inputting unit receives the signal (is activated), the corresponding action will be performed and the connection between the function of the scanner and all the other inputting units that are not activated will be terminated. Here, the possible corresponding actions comprise scanning the items waiting to be scanned, pre-scanning the items waiting to be scanned, and shifting the location of the scan head. At this time, it is no more important whether each inputting unit of the scanner is still monitored since the connection between the function of the scanner is terminated.

Here, it can be to fix the inactivated inputting units (for example, using mechanical bolt to prevent these inputting unit from being started), to make the inactivated inputting units unable to receive the signal and thus cut off the connection between the function of the scanner and the inactivated inputting units. It can be to make the signal received by the inactivated inputting units unable to be sent to other parts of the scanner, for example, cutting off the signal line connecting the inactivated inputting units and other parts of the scanner, and therefore cutting off the connection between the function of the scanner and each inactivated inputting unit. It can also be to cut off the connection between the function of the scanner and the inactivated inputting units through disabling other parts of the scanner from receiving the signals from the inactivated inputting units, for example, altering the IC layout of receiving signals.

As is shown in the flow block 14 and 13, when the specific action is finished, the connection between the function of the scanner and all inputting units resumes, and all the inputting units keep being monitored. Otherwise, the specific action is continually performed and the connection between the function of the scanner and all the other inactivated inputting units is terminated.

Figure 2:
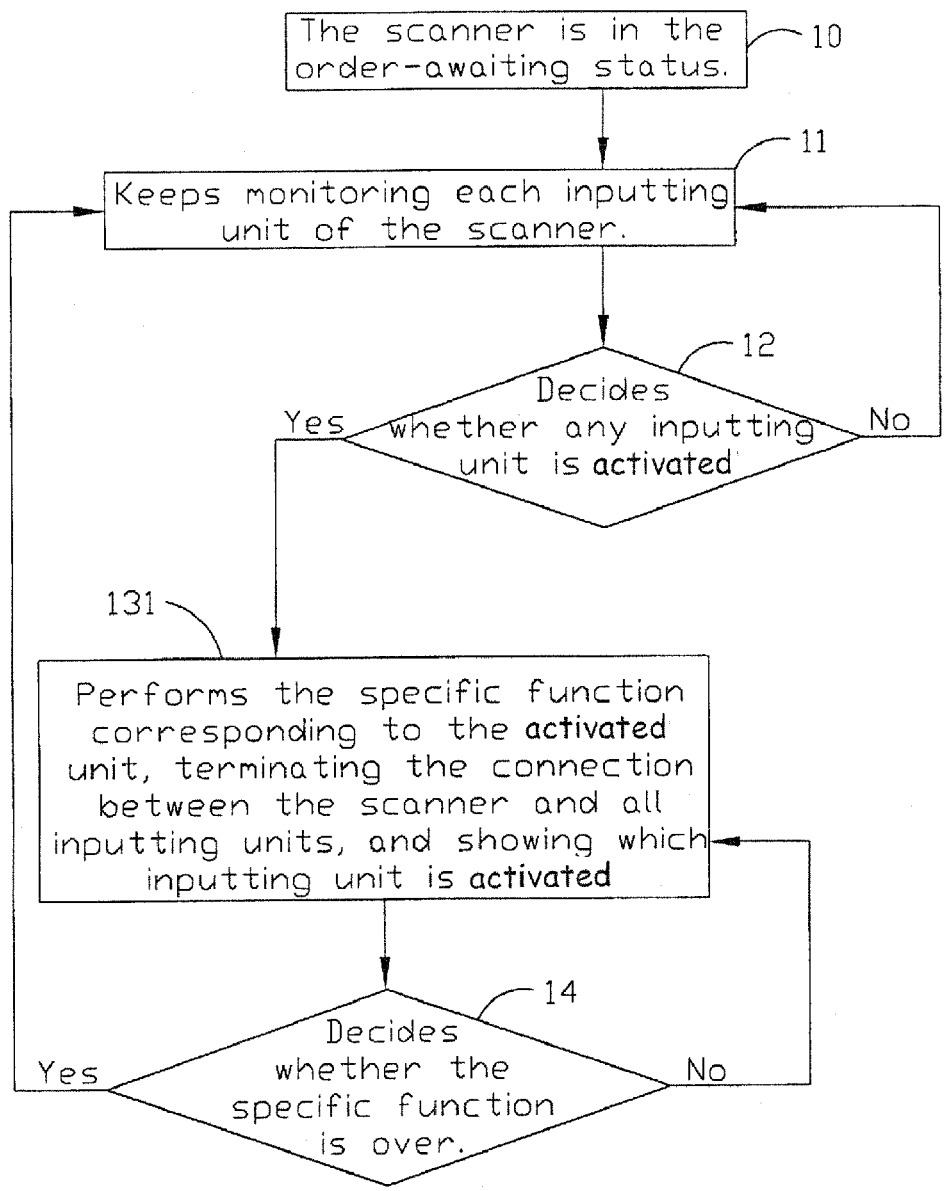

Another preferred embodiment of the invention is an amendment of the embodiment said above, which is basically similar to the one said in the process. However, the flow block 13 is altered to the flow block 131 in this embodiment. As is shown in the FIG. 2, the main difference between the flow block 13 and 131 is that the flow block 131 displays directly on the scanner which specific inputting unit is activated. Here, the possible methods of displaying include changing the geometric profile of specific inputting unit, changing the geometric location of specific inputting unit, lighting the light-emitting component located in specific inputting unit, or any other methods that can make the user easily find out the changes.

Figure 3:
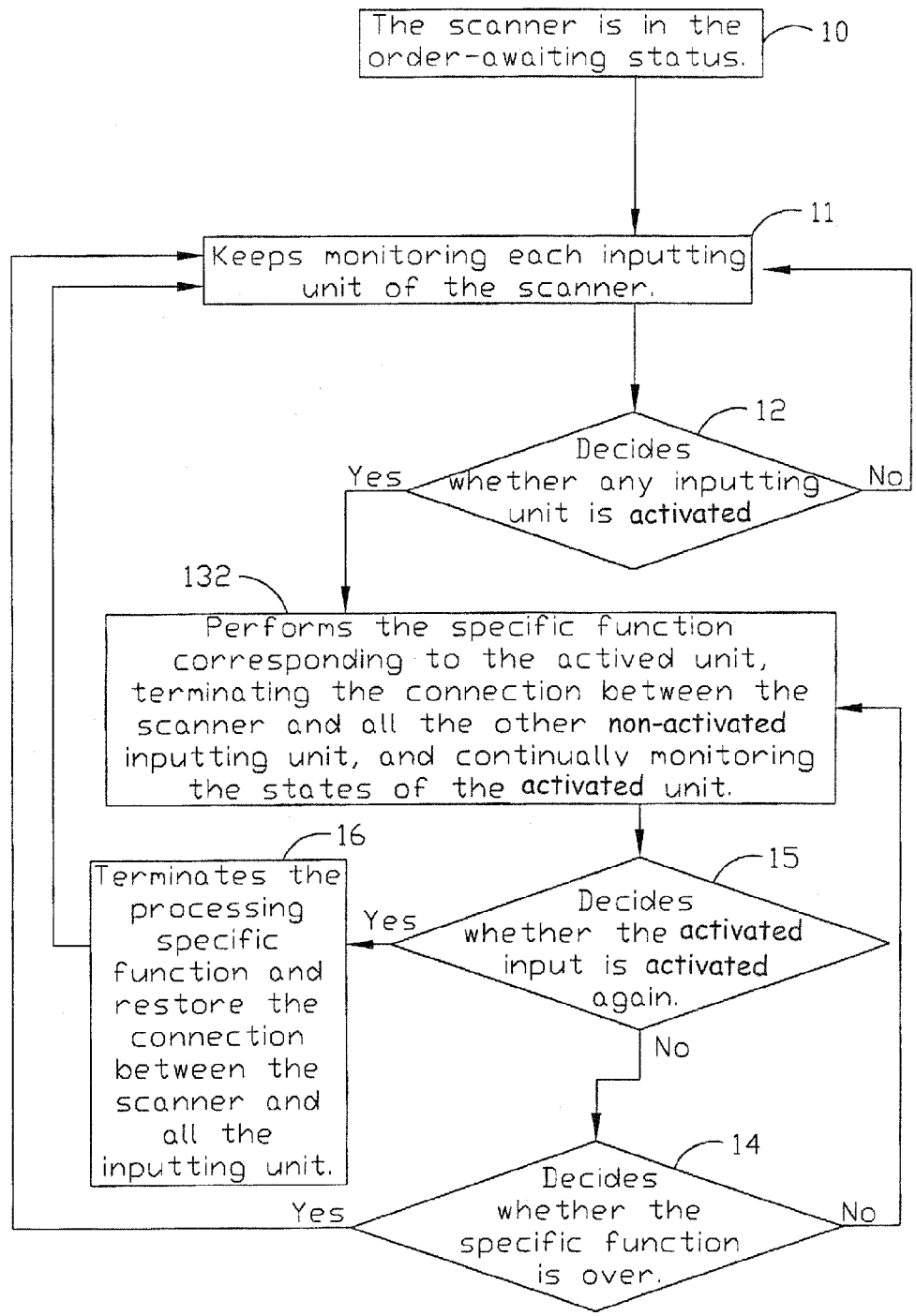

Another preferred embodiment of the invention is also the amendment of the first preferred embodiment, which is similar to the first one in process but is added hardware-cancellation function. As is shown in FIG. 3, this embodiment alters the flow block 13 to 132 and draws into the flow block 15.

Basically there is only one thing different between the flow block 132 and 13: the flow block 132 will constantly monitor on the status of activated inputting unit.

The flow block 15 is an action added between the flow block 132 and 14, decision whether the activated inputting unit is activated again (such as the button that has already been pressed down is pressed down again) and making response. If the activated inputting unit is activated again, both the flow block 15 and 16 will cancel the unfinished action processing by the scanner and resume the action of the flow block 11. If the activated inputting unit is not activated again, then the flow block 15 and the flow block 14 will let the unfinished action processing by the scanner continue to be performed.

Figure 4A:
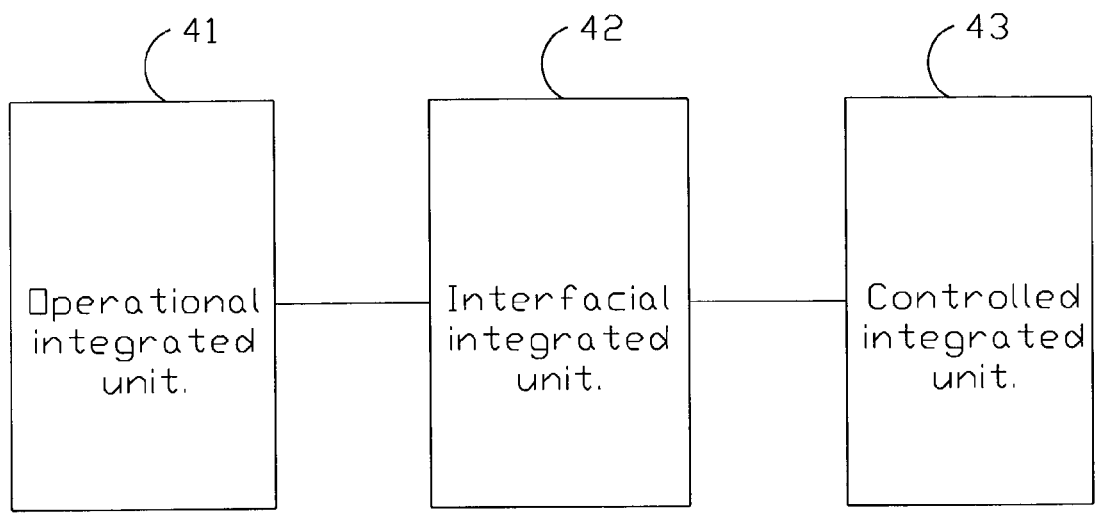
FIG. 4A and FIG. 4B are the structure block and the operation block of another preferred embodiment of the invention.
Figure 4B:
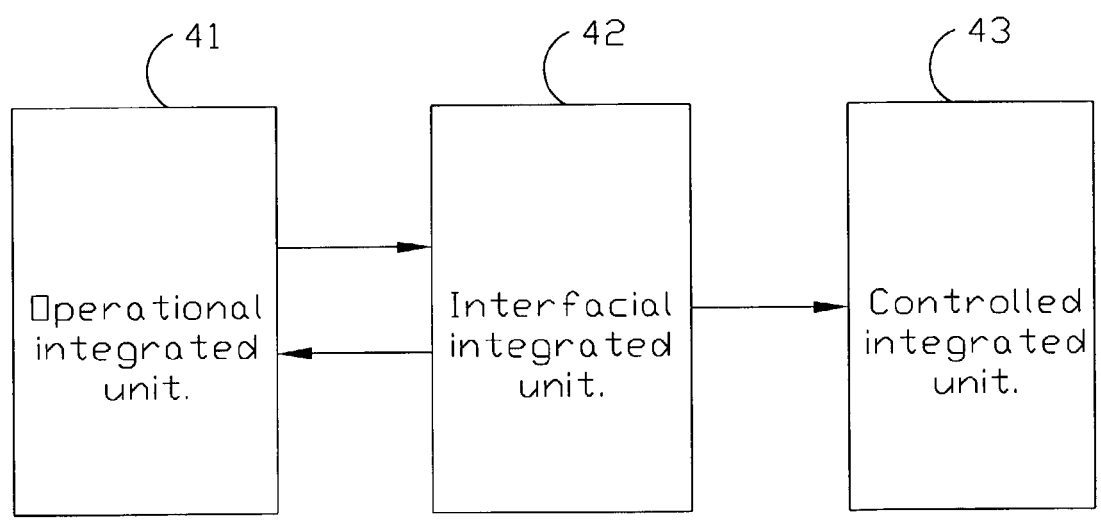

Another preferred embodiment of the invention is a scanner of inputting units with foolproof function. As is shown in FIG.4A and FIG.4B, comprising:

Operational integrated unit 41, used for performing the action of scanning items, etc. Interfacial integrated unit 42, used for receiving signals from the user, comprising essentially of one inputting unit.

Controlled integrated unit 43, used for controlling the function of both operational integrated unit 41 and interfacial integrated unit 42 according to the signals received by interfacial integrated unit 42; especially when a specific inputting unit is activated, or has been activated, it controls the connection between the inputting unit and the operational integrated unit 41.

Here, these inputting units can be mechanical buttons, electronic buttons, mechanical switches, electronic switches, or any combination of the items said above.

Here, when a certain inputting unit is activated, the controlled integrated unit 43 can drive the operational integrated unit 41 to perform a specific action, such as scanning the items waiting to be scanned, pre-scanning the items waiting to be scanned, and shifting the position of the scan head.

Here, while the operational integrated unit 41 is performing a specific action, the controlled integrated unit 43 can also determine that the function of the operational integrated unit 41 has no relation with the activation of other inputting units (which are not activated before), and can cancel the unfinished specific action in process when the specific inputting unit (the inputting unit that is activated before) is activated again.

Obviously, a main feature of the embodiment is that the controlled integrated unit 43 does not single-directionally receive signals from the interfacial integrated unit 42 and according to which direct the function of the operational integrated unit 41, but it will, according to the signals sent from the interfacial integrated 42, direct the function of the operational integrated unit 41, control the function of the interfacial integrated unit 42, and optionally receive or respond to the following signals sent from the interfacial integrated unit 42 at the same time.

What are said above are only the preferred embodiment of the invention and they are not used to limit the claims of the invention; Any changes or modifications that do not depart from the essence displayed by the invention should be limited in what is claimed in the following.

What is claimed is:

1. A method of operating a scanner equipped with inputting units comprising:
    monitoring a plurality of inputting units of a scanner;
    initiating at least one specific action in response to a first signal corresponding to at least one of the plurality of inputting units;
    disabling functionality of the plurality of inputting units not including the at least one inputting unit;
    monitoring the at least one inputting unit during at least a portion of the initiated action;
    canceling the initiated action in response to a second signal corresponding to the at least one inputting unit received during the initiated action; and
    resuming the connection between the function of the scanner and the plurality of inputting units not including the at least one inputting unit.

2. The method according to claim 1, wherein the at least one inputting unit is selected from the group comprising: mechanical buttons, electronic buttons, mechanical switches, and electronic switches.

3. The method according to claim 1, wherein the initiated action is selected from the group comprising: scanning, scanning and sending an e-mail, scanning and saving a file, scanning and sending a FAX, and scanning and printing.

4. The method according to claim 1, further comprising displaying directly on the scanner that the at least one inputting unit is activated.

5. The method according to claim 1, further comprising enabling functionality of the plurality of inputting units not including the at least one inputting unit after completion of the initiated action.

6. The method according to claim 1, wherein disabling functionality of the plurality of inputting units not including the at least one inputting unit, comprises disabling a capability of the plurality of inputting units to generate a signal.

7. The method according to the claim 1, wherein disabling functionality of the plurality of inputting units not including the at least one inputting unit comprises disabling a capability of the scanner to receive signals generated by the inputting units.

8. The method according to claim 1, further comprising:
    monitoring the plurality of inputting units during the initiated action; and
    receiving signals corresponding with said the plurality of inputting units during the initiated action.

9. The method according to the claim 8, further comprising performing actions corresponding with the received signals after completion of the initiated action so as not to interrupt the initiated action.

10. The method according to claim 8, wherein the received signals correspond to one or more inputting units in the scanner.

11. The method according to claim 10 further comprising providing the received signals to a controlled integrated unit of the scanner after completion of the initiated action.

12. A scanner comprising:
    an operational integrated unit arranged to perform scanning operations; a plurality of inputting units;
    an interfacial integrated unit arranged to receive at least one signal corresponding with at least one of the plurality of inputting units; and
    a controlled integrated unit arranged to:
        control a function of the operational integrated unit and the interfacial integrated unit according to the received at least one signal and to selectively control the connection between the plurality of inputting units and the operational integrated unit;
        control the operational integrated unit to perform an action in accordance with the received at least one signal and to disable functionality of the plurality of inputting units during performing of the action; and
        perform additional actions corresponding with the plurality of inputting units after completion of the action so as not to interrupt the action.

13. The scanner according to claim 12, wherein the at least one inputting unit is selected from the group comprising: mechanical buttons, electronic buttons, mechanical switches, and electronic switches.

14. The scanner according to claim 12, wherein the action is selected from the group comprising: scanning, scanning and sending an e-mail, scanning and saving a file, scanning and sending a FAX, and scanning and printing.

15. An apparatus comprising:

means for initiating at least one action in response to a first signal corresponding to at least one of a plurality of inputting units of a scanner;

means for monitoring the plurality of inputting units during the initiated action;

means for receiving signals corresponding with the plurality of inputting units during the initiated action;

means for performing actions corresponding with the received signals; and means for enabling functionality of the plurality of inputting units not including the at least one inputting unit after completion of the initiated action.

16. The apparatus of claim 15, including means for canceling the initiated action in response to a second signal corresponding to the at least one inputting unit received during the initiated action.

17. The apparatus of claim 15, further comprising:

means for disabling a functionality of the plurality of inputting units not including the at least one inputting unit; and means for resuming the functionality of the plurality of inputting units not including the at least one inputting unit.

18. The apparatus of claim 15 wherein the actions corresponding with the received signals are performed after completion of the initiated action so as not to interrupt the initiated action.

19. The scanner according to claim 17, wherein the functionality of the inputting units is resumed after completion of the initiated action so as not to interrupt the initiated action.

20. The scanner according to claim 12, wherein the controlled integrated unit is further arranged to cancel the action in response to a second signal corresponding with the at least one of the plurality of inputting units.

* * * * *